US009207150B2

(12) United States Patent
Buresh

(10) Patent No.: US 9,207,150 B2
(45) Date of Patent: Dec. 8, 2015

(54) TREAD SURFACE STRUCTURES FOR MUD EVACUATION

(75) Inventor: Patrick J Buresh, Bend, OR (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 908 days.

(21) Appl. No.: 12/952,411

(22) Filed: Nov. 23, 2010

(65) Prior Publication Data

US 2011/0125465 A1    May 26, 2011

Related U.S. Application Data

(60) Provisional application No. 61/264,450, filed on Nov. 25, 2009.

(51) Int. Cl.
| | |
|---|---|
| B60C 11/13 | (2006.01) |
| G01M 17/02 | (2006.01) |
| B60C 11/03 | (2006.01) |

(52) U.S. Cl.
CPC ......... *G01M 17/021* (2013.01); *B60C 11/0311* (2013.04); *B60C 11/0316* (2013.04); *B60C 11/0323* (2013.04); *B60C 11/1353* (2013.04);
(Continued)

(58) Field of Classification Search
CPC ............. B60C 11/032; B60C 11/0323; B60C 11/1353; B60C 2011/1353; B60C 2011/1361; B60C 2011/1338; B60C 11/0311; B60C 11/0316
USPC ............. 152/209.12, 209.16, 209.18, 209.19, 152/209.17, 209.21, 209.22, 209.25
See application file for complete search history.

(56) References Cited

U.S. PATENT DOCUMENTS

| | | |
|---|---|---|
| 3,030,998 A | 2/1960 | Jensen |
| 3,817,306 A | 6/1974 | Sidles |

(Continued)

FOREIGN PATENT DOCUMENTS

| | | | |
|---|---|---|---|
| FR | 1163341 | * | 9/1958 |
| JP | 63-154407 | * | 6/1988 |

(Continued)

OTHER PUBLICATIONS

English machine translation of JP07-017217, no date.*

(Continued)

*Primary Examiner* — Steven D Maki
*Assistant Examiner* — Robert Dye
(74) *Attorney, Agent, or Firm* — Frank J. Campigotto

(57) ABSTRACT

The present invention provides structures on the tread of a tire that improve the evacuation of mud, soil and the like. In particular, different tread features are provided that may improve the evacuation of mud, soil and the like by themselves or by strategically combining them. These different tread features may be tested to see how they affect mud evacuation at different rotational speeds by a test apparatus that mimics the performance of a tire. For example, a tread that has offset shoulder tread blocks, which shows good mud evacuation at lower speeds, may be combined with shoulder grooves with pockets that show good mud evacuation at intermediate speeds to see if this combination provides a solution that has the lowest change of speed necessary to evacuate 50-87% of the mud found in the grooves.

6 Claims, 14 Drawing Sheets

(52) U.S. Cl.
CPC ......... *B60C 11/032* (2013.04); *B60C 2011/133* (2013.04); *B60C 2011/1338* (2013.04); *B60C 2011/1361* (2013.04); *B60C 2200/065* (2013.04); *B60C 2200/14* (2013.04)

(56) References Cited

U.S. PATENT DOCUMENTS

| | | | | |
|---|---|---|---|---|
| 4,364,426 | A | * | 12/1982 | Mills et al. ................ 152/209.11 |
| 4,823,855 | A | * | 4/1989 | Goergen et al. .......... 152/209.18 |
| 5,016,696 | A | | 5/1991 | Bonko et al. |
| 5,503,207 | A | * | 4/1996 | Ochiai et al. ............. 152/209.21 |
| 6,189,586 | B1 | | 2/2001 | Guidry |
| 6,536,490 | B2 | | 3/2003 | Rooney |
| 6,866,076 | B2 | * | 3/2005 | Ohsawa ................... 152/209.21 |
| 6,986,372 | B2 | | 1/2006 | Below |
| 2005/0109437 | A1 | * | 5/2005 | Shirouzu ................... 152/209.15 |
| 2009/0218019 | A1 | * | 9/2009 | Paturle ..................... 152/209.18 |

FOREIGN PATENT DOCUMENTS

| | | | |
|---|---|---|---|
| JP | 07-017217 | * | 1/1995 |
| JP | 08-268011 | * | 10/1996 |
| JP | 09-156322 | * | 7/1997 |
| JP | 10-076810 | * | 3/1998 |
| JP | 10-230708 | * | 9/1998 |
| JP | 2000-280711 | * | 10/2000 |
| JP | 2004-196145 | * | 7/2004 |
| JP | 2007-161192 | * | 6/2007 |

OTHER PUBLICATIONS

English machine translation of JP10-230708, no date.*
English machine translation of JP2000-280711, dated Oct. 2000.*
English machine translation of JP10-076810, dated Mar. 1998.*
English machine translation of FR1163341, dated Sep. 1998.*

* cited by examiner

TREAD SURFACE STRUCTURES FOR MUD EVACUATION

PRIORITY CLAIM

This application claims the benefit of previously filed U.S. Provisional Patent Application entitled "Tread Surface Structures for Mud Evacuation", assigned U.S. Ser. No. 61/264,450, filed Nov. 25, 2009, and which is incorporated by reference in its entirety for all purposes.

BACKGROUND OF THE INVENTION

Tires usually have tread features with biting edges for improved traction and grooves for the consumption of water and snow so that they can perform adequately in inclement weather. In off road applications, which are frequently experienced by vehicles used in agriculture, mining, construction, recreation, etc., these tires often encounter sand, mud, soil, and the like that enter grooves and get stuck therein, covering features that have biting edges, decreasing traction significantly. The tire then begins to behave like a slick tire that has no tread features that provide traction. This leads to a vehicle getting stuck in place. Accordingly, those skilled in the art of tire design have repeatedly tried to improve the performance of tires in muddy, sandy and/or dirty environments by adding features to a tread of a tire that improve the evacuation of mud, dirt, sand and the like from the grooves of the tire. There still exists a need to further improve this performance characteristic of a tire in a predictable and systematic matter.

SUMMARY OF THE INVENTION

A first group of embodiments comprises a series of macro tread geometries including a number of tread groove configurations. Some examples of such geometries include those with shoulder grooves and center grooves having predetermined widths, depths and draft angles. In some cases, the shoulder grooves are 12 mm deep, are 30 mm wide and have a draft angle of 15 degrees. In other cases, the shoulder grooves are 20 mm wide. Another tread groove configuration includes one where the tread blocks are staggered with a 15 mm offset. In such a case, the grooves may all have a 12 mm depth and the center grooves may be 30 mm wide while the shoulder grooves may have groove width of 26.5 mm. In still other embodiments, the draft angle is reduced to 8 degrees. Sometimes, the shoulder groove depth is increased to 18 mm. In another embodiment, the bottom surface of the groove has an irregular finish instead of being smooth. In such a case, the bottom groove surface may be facetted. These facets may be shaped as steps where one end of the step is formed by shelf with a predetermined depth and the other end of the step is flush with the bottom surface of the groove. An angled transition may connect the two ends of the facet. The depth of the facet may be 1-2 mm and the width of the angled transition may be 26-28 mm.

A second group of embodiments includes mud "busting" features that help to break the adhesion of mud, sand, etc. to the walls and/or bottom surface of the grooves of tires. These features are typically sized on a macro scale. One example of a mud busting feature is the presence of a pocket located on a wall or bottom surface of a groove. In some cases, the pocket is found in a ridge on the bottom surface of the groove. The cross sectional shape of the pocket may be a triangle. The width and depth of the triangular shape may be adjusted as desired and may range from 2.5-3.5 mm and 3.8-2.15 mm respectively. In some cases, the pocket is completely sealed from the atmosphere when the groove is filled with matter. In other situations, the pocket may extend laterally to an opening to atmosphere which remains open even when the groove is filled with matter. Another example of a mud busting feature is the use of fin or fins on the sidewall or bottom surface of a groove.

A third group of embodiments comprises different groove wall textures on a micro scale that act to reduce the suction that keeps matter in grooves of a tire. One such embodiment comprises a series of small grooves or stries found on the groove walls or bottom groove surface. In some cases, the stries cross each other perpendicularly in the axial and circumferential directions of the tread. The depth of such stries may be 0.75 mm and may have a pitch of 2.25 mm in both orthogonal directions. In a similar case, the stries cross each with a depth of 0.2 mm with a pitch of 2.0 mm in both orthogonal directions.

In other cases, the stries are aligned in only one direction. In such a case, the stries may be 0.75 mm deep with a 7.5 mm pitch and may be oriented in the axial direction of the tread. In another similar case, the stries may be 0.2 mm deep with a 0.6 mm pitch and may be oriented in circumferential direction of the tread.

In some cases, the stries have cross-sectional shapes that are inverted triangles having an included angle at their bottom portion of ninety degrees.

In yet another embodiment, small holes or dimples are found along the surfaces of the grooves. In one example of dimples or holes, the depth may be 0.75 mm and the dimples or holes may be arranged in a rectangular array wherein the pitch of the dimples or holes is 7.5 mm in both the axial and circumferential directions of the tread. In another example of dimples or holes, the depth of the dimples or holes is 0.2 mm and they are arranged in a rectangular array with their pitch being 0.6 mm. In some cases, the dimples or holes are shaped like inverted cones with an included angle at their bottom portion of ninety degrees.

Yet another example of groove wall textures comprises velours. Velours may include small pillars on groove surfaces on a micro scale. The pillars may be 0.15 mm in diameter and 0.3-0.4 mm in height and be arranged in rectangular pattern with a pitch of 0.2 mm in both the axial and circumferential directions of the tread. In some cases, the pillars are found only on the surfaces that form the shoulder groove of the tires. These pillars may be formed in some cases by burning holes into the surfaces of a mold that form the grooves of the tread using a laser.

Another example of groove wall textures may have square shaped columns that are 0.01 mm long on each side and 0.005 mm in height with a pitch of 0.02 mm in both the axial and circumferential directions of the tread. These columns may be formed by placing a film having holes that are complimentary shaped to the columns onto the surfaces of the mold that form the grooves of the tread.

These groups of embodiments of the present invention may be used in the following method to improve the design and testing of evacuation of matter from the grooves of a tire. The method includes the following steps. First, test samples of treads having a various features for facilitating the evacuation of matter from a groove are provided and matter is compacted into the grooves of the samples. Second, a centrifugal testing apparatus, to which the samples with matter compacted in their grooves are attached, is provided. Third, the matter in the grooves of the samples is evacuated by rotating the testing apparatus and the progress of the evacuation of the matter versus rotational speed of the apparatus is recorded and analyzed. Fourth, a first feature for facilitating the evacuation of matter from a groove is selected based on the rotational speed necessary to evacuate a first predetermined percentage of mater from the groove initially. This first predetermined percentage of matter evacuation may be 13%. Preferably, the feature chosen in this step is one that shows the lowest rotational speed of the test apparatus to achieve the first percentage of matter evacuation. Fifth, a second feature that facilitates the evacuation of matter is selected based on the change of speed necessary to evacuate matter from the grooves of the sample from the first predetermined percentage to a second predetermined percentage. Preferably, the feature chosen in the fifth step is one that shows the lowest change of speed of rotation of the test apparatus to reach the second percentage from the first percentage. In some cases, the second percentage of matter evacuation is 50%. Sixth, the features chosen from the fourth and fifth steps are combined in the same groove geometry and tested for matter evacuation.

For example, treads that have staggered tread blocks that exhibit good initial mud evacuation may be combined with treads that have grooves with pockets found on their bottom surfaces that exhibit good intermediate mud evacuation and tested to see if combining these features reduces the necessary change in rotational speed to evacuate all of the mud from the tread. If the results are not favorable, then iteration is necessary. If the results are favorable, then a complete tire may be created that has a tread that exhibits the combined features for further testing. If the results of the testing of the full tire are favorable, then the tire may be commercialized. Of course, this method can be used for other types of matter that may be stuck in the groove of a tire tread such as sand, dirt, etc.

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE REPRESENTATIVE EMBODIMENTS

Reference will now be made in detail to embodiments of the invention, one or more examples of which are illustrated in the Figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. Reference numbers are used in the Figures solely to aid the reader in identifying the various elements and are not intended to introduce any limiting distinctions among the embodiments. Common or similar numbering for one embodiment indicates a similar element in the other embodiments.

Testing Apparatus

Figure 1:
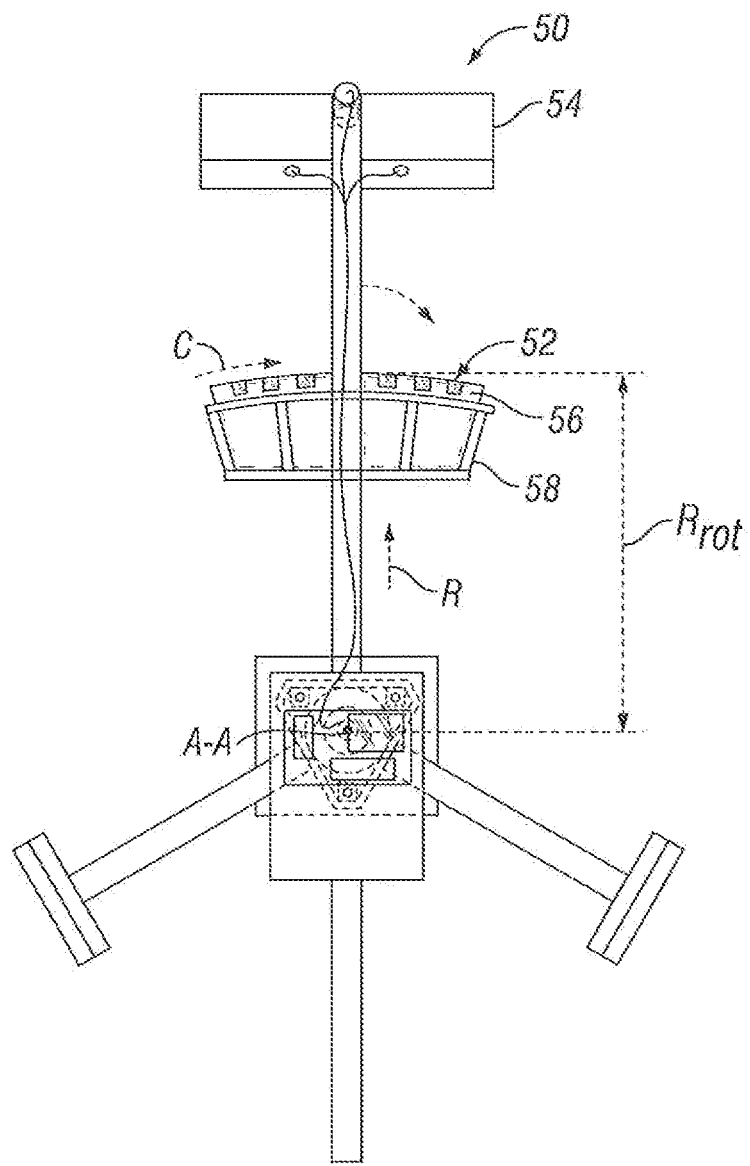
FIG. 1 is a front view of a centrifugal testing apparatus according to an aspect of the invention.
Figure 2:
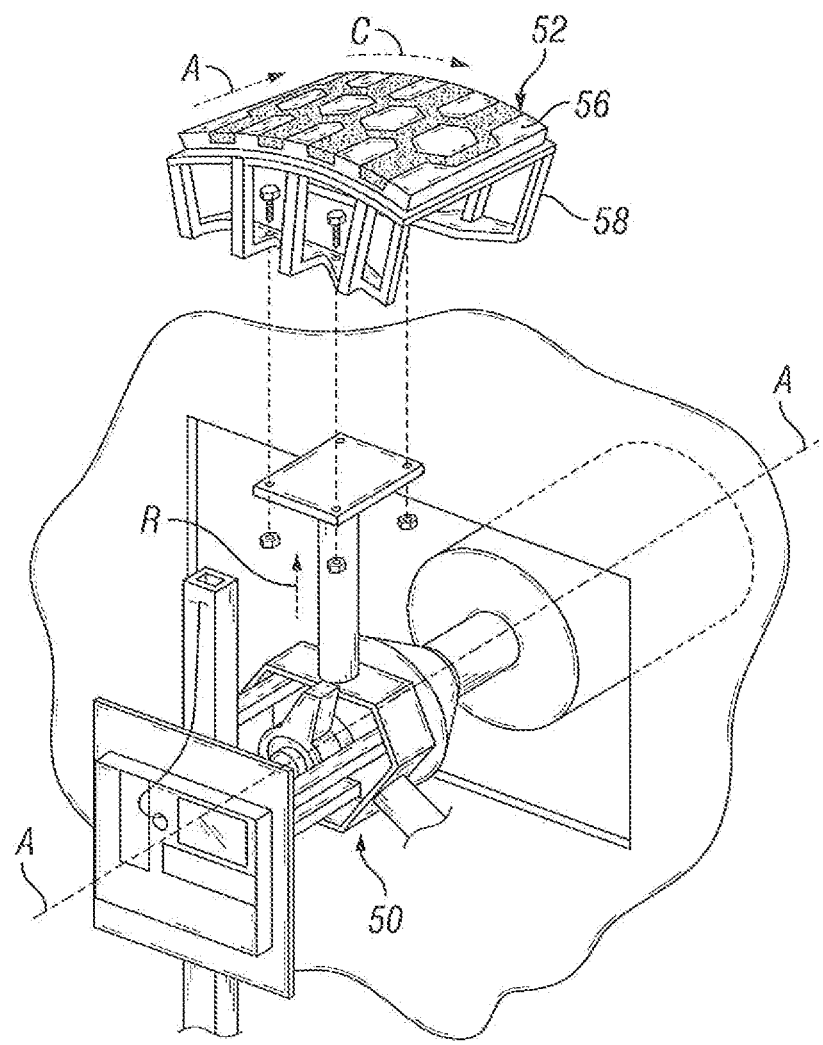
FIG. 2 is an enlarged perspective view of the testing apparatus of FIG. 1 wherein the camera has been removed to show the attachment of a tread sample to the apparatus more clearly.

FIGS. 1 and 2 show a centrifugal testing apparatus 50 for testing the evacuation of mud, dirt, sand, etc. from a test tread 52 that can be fastened to the apparatus. The test tread 52 is configured with grooves having features whose ability to aid the evacuation of mud and the like is desired to be measured. The test tread 52 comprises a rubber portion 56 that can be attached to a mounting bracket 58. Then, the matter such as mud is compacted into the grooves, ensuring as much air as possible is removed from the grooves to provide as much consistency when testing. Once the test tread is attached to testing apparatus 50, it mimics a sector of a tire and has circumferential C, axial A, and radial R directions. Advantageously, even the curvature of the rubber portion of tread sample matches that of a tire having the same radius as the radius of rotation, $R_{rot}$, which is measured from the outside circumference of the rubber portion 56 of the tread sample to the axis of rotation, A-A, of the testing apparatus 50 in the radial direction R of the mimicked tire. For this embodiment of the testing apparatus, the $R_{rot}$ is approximately 422 mm but this can be varied to mimic the mud evacuating performance of other sized tires.

After the test tread 52 with the mud is fastened to the apparatus 50 via the mounting bracket 58, the test apparatus is rotated in increments of increasing speed. A camera 54 is located near the tread sample and rotates therewith, recording visual images of the mud as it starts to evacuate from the grooves. These images are later analyzed using optical data acquisition and analysis techniques so that the percentage of mud evacuation versus rotational speed of the apparatus 50 can be plotted in tabular and graphical form. The data may also be processed to show the change in rotational speed necessary to reach a certain change in the percentage of mud evacuation. Likewise, the average values and standard deviations of these parameters can be calculated for multiple tests of the same tread sample 52. A discussion of these types of test results for different tread structures and configurations is provided below.

Group I

Tread Groove Structures

Turning to FIGS. 3A-3F different scenarios of tread groove structures and/or configurations on a macro scale that were tested using the above mentioned testing apparatus and techniques are shown.

Figure 3A:
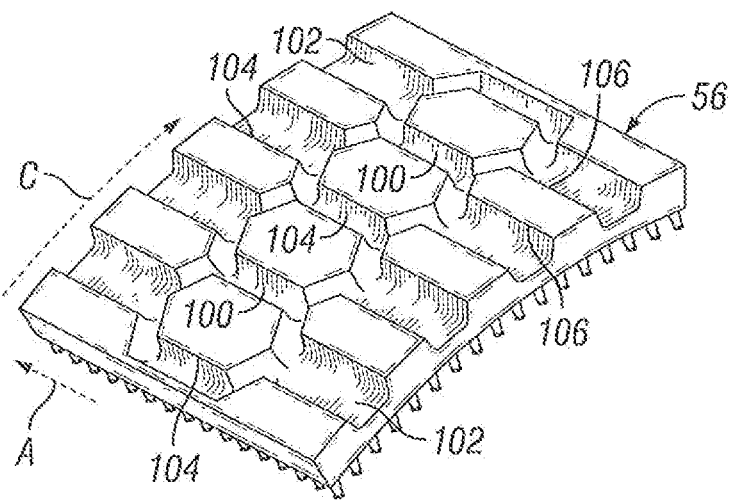
FIG. 3A is a perspective view of a typical tread sample according to an aspect of the present invention.
Figure 3B:
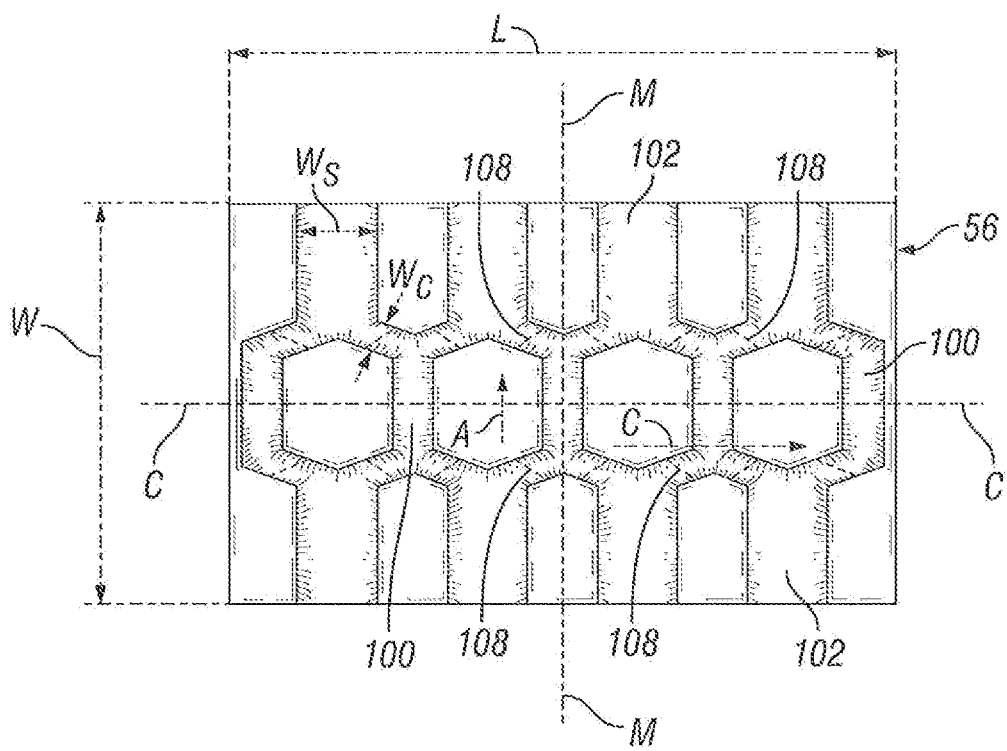
FIG. 3B is a top view of the tread of FIG. 3A that has been flattened out.
Figure 3C:
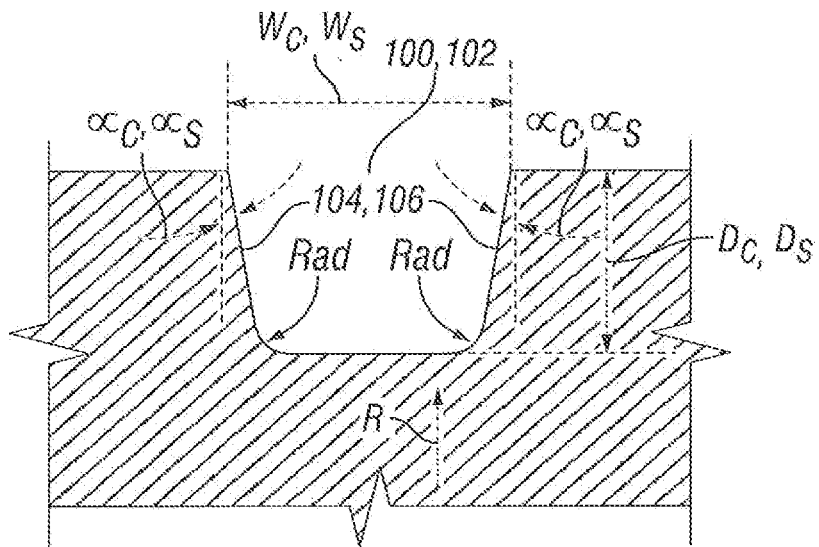
FIG. 3C is a partial cross-sectional view of the typical profile of the center and shoulder grooves of various tread samples.

FIGS. 3A, 3B, and 3C show the basic configuration of the rubber portion 56 of the tread sample 52 used for testing these scenarios. It comprises center grooves 100 that have predetermined depths, $D_C$, and widths, $W_C$, and shoulder grooves 102 that have predetermined depths, $D_S$, and widths, $W_S$. The center grooves 100 also have a draft angle, $α_C$, on its sidewalls 104 and the shoulder grooves 102 have a draft angle, $α_S$, on its sidewalls, 106. Dotted lines 108 in FIG. 3B show the demarcation between the center and shoulder grooves, indicating approximately where dimensional values between these grooves change if they are in fact different. It should be noted that FIG. 3B is a flattened out version of the curved tread of FIG. 3A and that all dimensions given herein are the linear distances produced when dimensions of curved tread samples are flattened out. All scenarios had a common length, L, and width, W, and were made from the same rubber composition. For this embodiment, the length, L, is 245 mm in the circumferential direction C and width, W, is 225 mm in the axial direction A. FIG. 3C shows the general profile of both sets of grooves, defining the geometry thereof including their draft angles $α_C$, $α_S$ on the sidewalls, 104, 106, widths, $W_C$, $W_S$, depths, $D_C$, $D_S$ and radii, Rad, found at their bottom surfaces. Similarly, all of these scenarios also had the same value for Rad of 4 mm. Of course, the values of all these variables could be altered as desired. It should be noted that all the tread samples discussed herein are symmetrical about midplanes, C-C and M-M (see FIG. 3B).

Figure 3D:
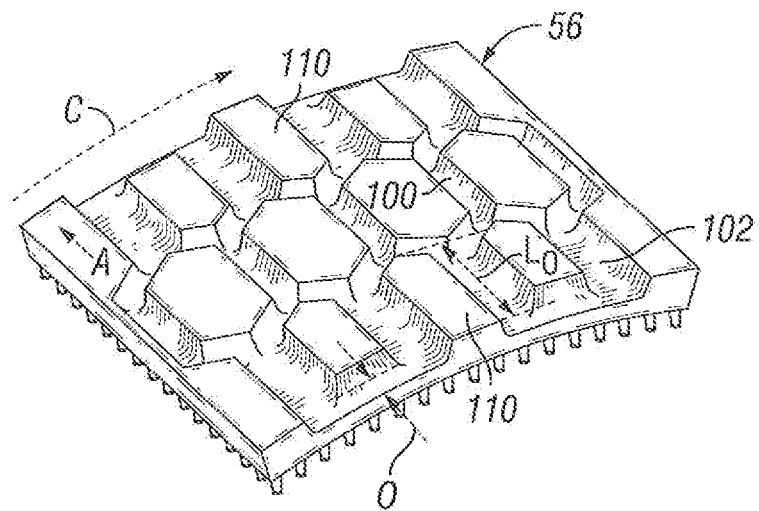
FIG. 3D shows an example of a tread design where the outside tread blocks are staggered with a predetermined offset.

FIG. 3D shows that the outside tread blocks 110 have a length, $L_O$, in the axial direction A of the tread. For all the scenarios discussed herein, $L_O$ is approximately 73 mm. This figure also shows that in some scenarios, the outside tread blocks 110 are staggered by an offset, O, which necessitates a reduction in the width of the shoulder groove in order to preserve the volume of the shoulder grooves 102 between scenarios that have and do not have the offset. In such a case, O is 15 mm and $W_S$ is 26.5 mm.

Figure 3E:
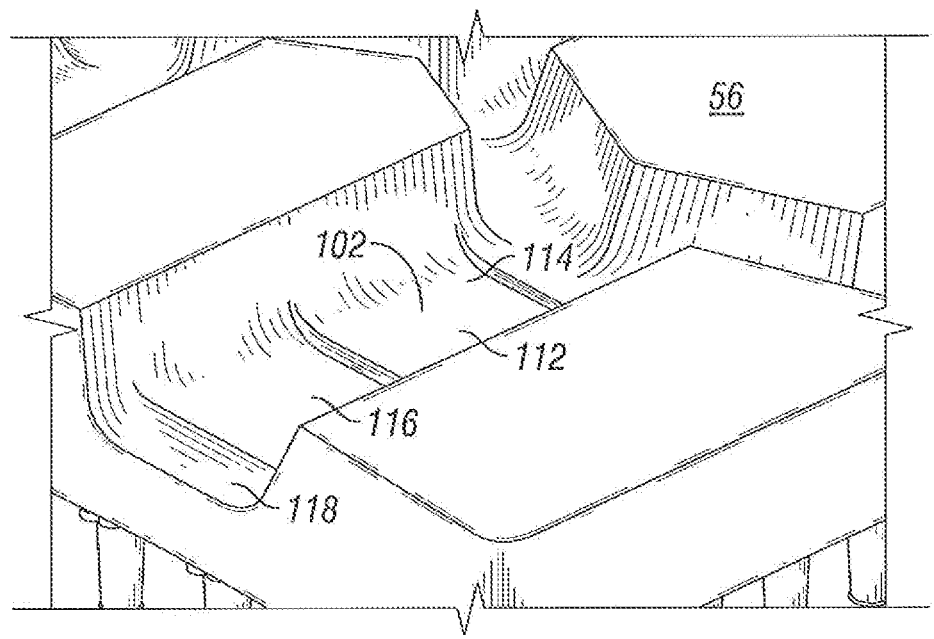
FIG. 3E illustrates a scenario where the bottom surfaces of the shoulder grooves of the tread sample are not smooth but have an irregular, facetted shape.
Figure 3F:
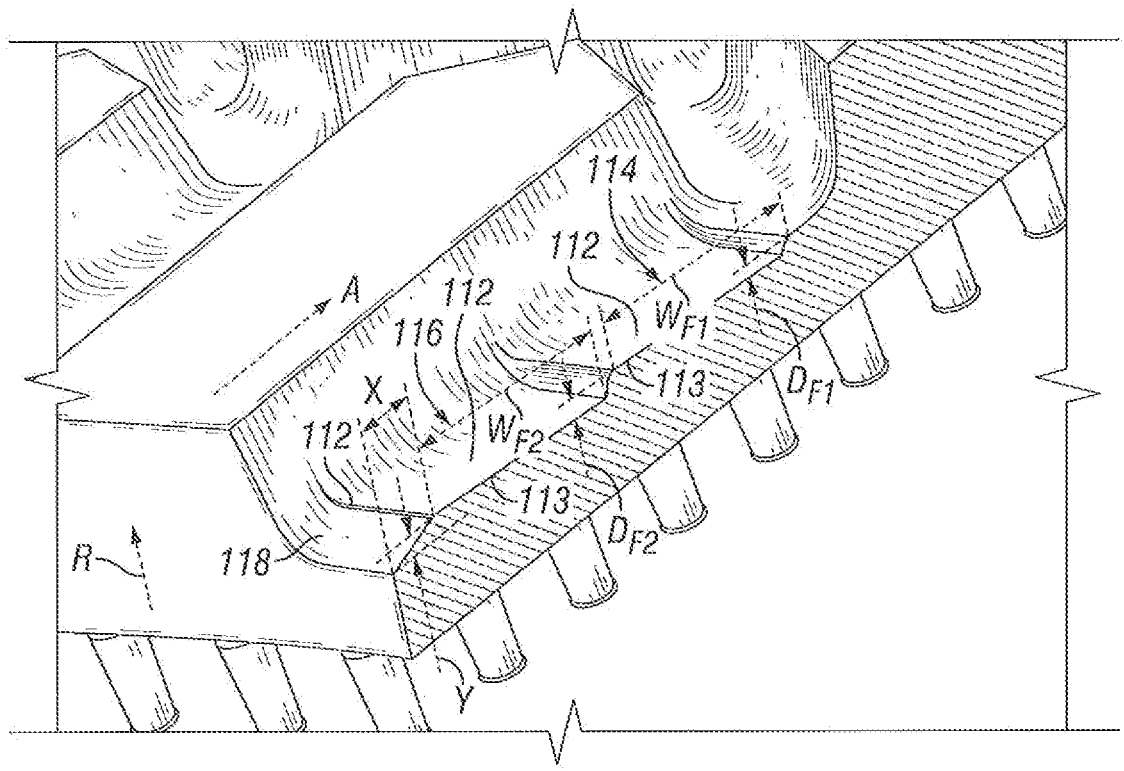
FIG. 3F depicts the profile and dimensions of the facets found on the bottom surface of the shoulder grooves of the tread sample of FIG. 3E.
Figure 4A:
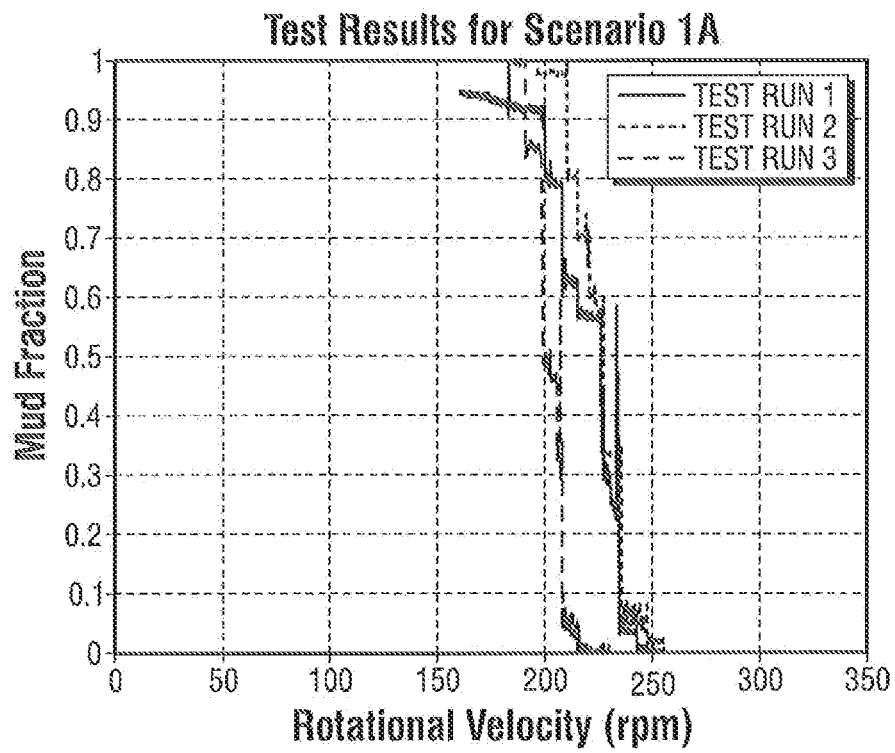
FIGS. 4A thru 4E contain graphs showing the mud fraction left in the grooves of the tread samples for scenarios 1A thru 1E versus rotational speed of the test apparatus for multiple runs for each scenario.
Figure 4B:
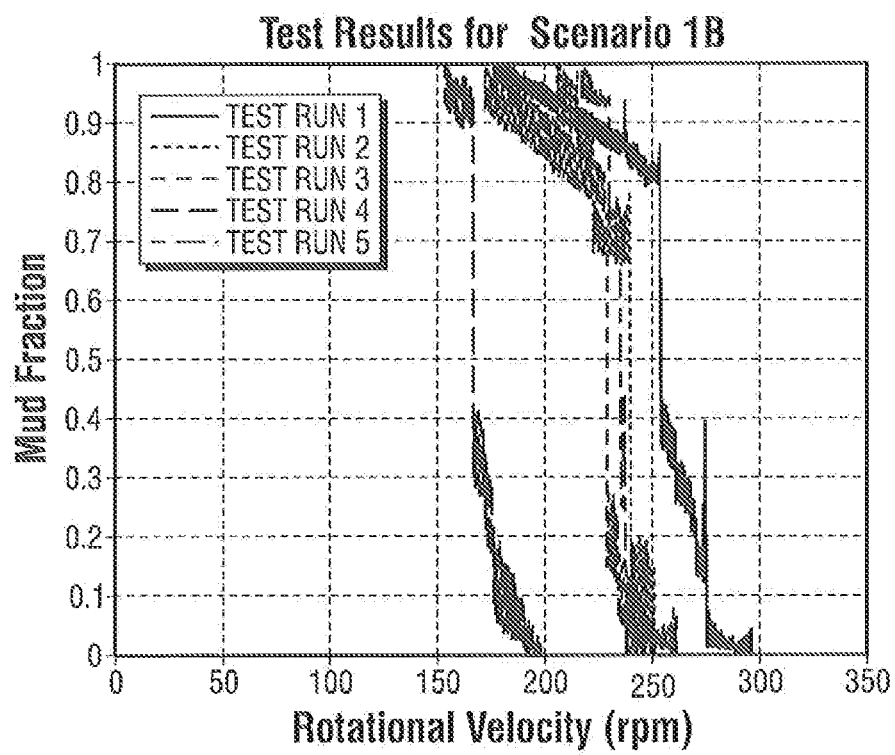
Figure 4C:
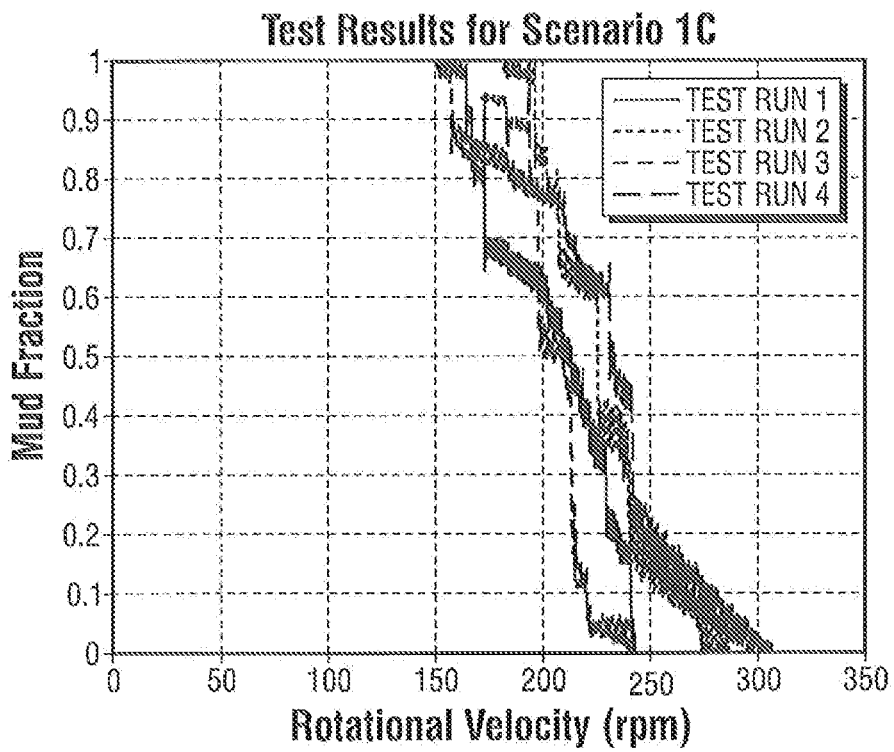
Figure 4D:
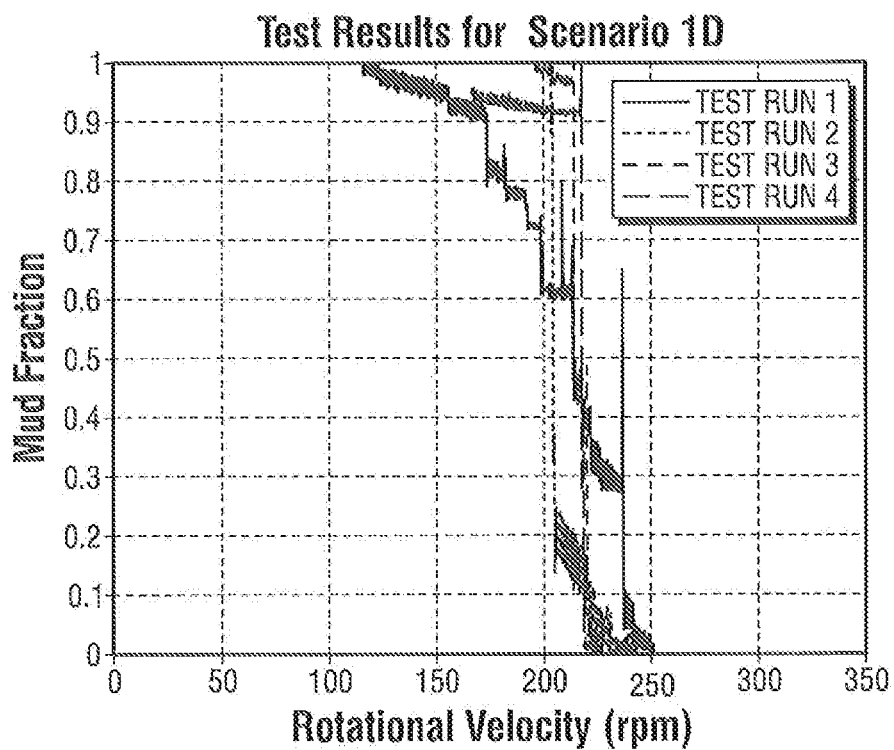
Figure 4E:
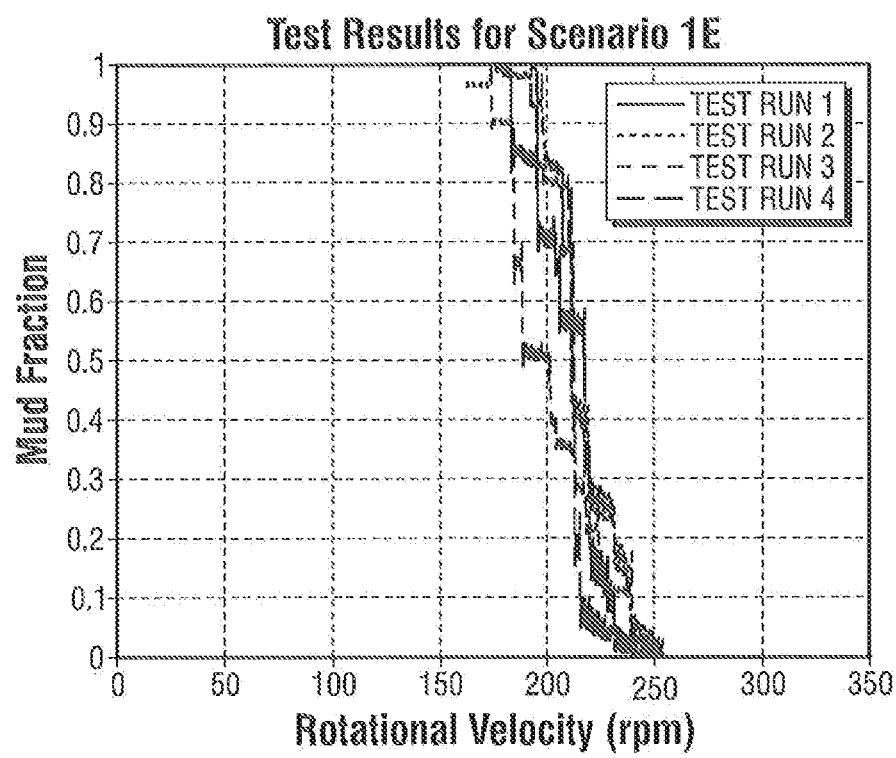

FIG. 3E shows a scenario where the bottom surface 112 of the shoulder grooves 102 is not smooth but has an irregular, facetted shape. FIG. 3F shows the profile of these facets and that they are in fact steps that have angled transitions 113 from one end, which is a shelf, of the step to the other end, which is flush with the bottom surface 112 of the shoulder groove 102. The first step 114, which is found adjacent to the Y shaped intersection of the shoulder grooves 102, has a depth, $D_{F1}$, in the radial direction R and width, $W_{F1}$, in the axial direction A. Likewise, the second step 116, which is located next to the first step 114 toward the outside of the tread, also has a depth, $D_{F2}$, in the radial direction R and a width, $W_{F2}$, in the axial direction A. For this particular embodiment, the depths of these steps, $D_{F1}$ and $D_{F2}$, are approximately 1 mm and 2 mm respectively and the widths of these steps, $W_{F1}$ and $W_{F2}$, are approximately 27.5 mm and 26.5 mm respectively. Lastly, a chamfer 118 leads from the second step 116 to the side of the tread. The chamfer 118 has a depth, Y, in the radial direction R and a width, X, in the axial direction A. For this embodiment, the values of Y and X are 2 mm and 7 mm respectively. Of course, all of these dimensions could be varied as desired.

For convenience, the relevant data that differentiate these different scenarios for Group 1 including scenario 1A, which is provided as a reference, is provided in Table 1 below. The geometry for the center grooves was the same for all of these scenarios.

TABLE 1

| Scenario | $D_c$ | $W_c$ | $D_s$ | $W_s$ | $α_s$ | O | Bottom Surface of Shoulder Groove is Facetted |
|---|---|---|---|---|---|---|---|
| 1A | 12 mm | 15 mm | 12 mm | 30 mm | 15° | 0 | No |
| 1B | 12 mm | 15 mm | 12 mm | 20 mm | 15° | 0 | No |
| 1C | 12 mm | 15 mm | 12 mm | 26.5 mm | 15° | 15 mm | No |
| 1D | 12 mm | 15 mm | 12 mm | 30 mm | 8° | 0 | No |
| 1E | 12 mm | 15 mm | 12 mm | 30 mm | 15° | 0 | Yes |

As briefly mentioned before, the mud is compacted into the grooves before testing commences to help eliminate the presence of any air that could be trapped in the mud so that consistent testing can be achieved. Once testing commences, the testing apparatus 50 rotates at increasing speeds and the amount of mud that evacuates from the grooves is recorded by the camera 54. The data captured by the camera 54 is analyzed and the rotational speed versus the fraction of mud left in the grooves of a test tread 52 is plotted graphically. See FIGS. 4A-4E for graphs showing this data for numerous test runs for scenarios 1A thru 1E that were conducted. Also, the data concerning the rotational speed of the apparatus that is necessary to achieve 13%, 50%, and 87% mud evacuation was calculated as were the changes in speed necessary to go from 13% to 50%, 13% to 87%, and 50% to 87% mud evacuation. Since multiple test runs were made for a single scenario, the averages of these parameters as well as the standard deviations were also calculated. See Table 2 for values of all these variables for the multiple test runs that were performed on scenarios 1A thru 1E.

TABLE 2

| SCENARIO | Avg. 13% Evac. RPM | Std. Dev. 13% Evac. RPM | Avg. 50% Evac. RPM | Std. Dev. 50% Evac. RPM | Avg. 87% Evac. RPM | Std. Dev. 87% Evac. RPM | Avg. Diff. 13% to 50% | Std. Dev. 13% to 50% | Avg. Diff. 50% to 87% | Std. Dev. 50% to 87% | Avg. Diff. 13% to 87% | Std. Dev. 13% to 87% |
|---|---|---|---|---|---|---|---|---|---|---|---|---|
| 1A | 201.1 | 9.4 | 217.9 | 16.0 | 226.1 | 15.6 | 16.9 | 9.1 | 8.2 | 0.6 | 25.0 | 8.5 |
| 1B | 205.4 | 26.5 | 225.0 | 33.6 | 232.2 | 35.0 | 19.6 | 16.8 | 7.2 | 7.7 | 26.8 | 19.0 |
| 1C | 176.4 | 17.2 | 216.8 | 14.1 | 239.0 | 16.8 | 40.4 | 7.7 | 22.2 | 7.5 | 62.5 | 11.2 |
| 1D | 203.3 | 20.2 | 213.5 | 6.0 | 222.8 | 10.2 | 10.2 | 19.9 | 9.3 | 9.6 | 19.5 | 29.1 |
| 1E | 190.8 | 7.8 | 208.5 | 12.1 | 224.8 | 8.9 | 17.7 | 12.4 | 16.3 | 15.9 | 34.0 | 9.1 |

Looking at these test results, several items should be noted. Scenario 1C had the lowest average rotational speed of 176.4 RPM to achieve 13% mud evacuation. This can likely be attributed to early evacuation of the unrestrained mud located at the shoulder grooves that were created by the offset of every other shoulder block (see grooves in FIG. 3D that are adjacent to dimension O). This conclusion was supported by the images captured by the camera 54 during the initial mud evacuation of these grooves. However, scenario 1C had the greatest average differential in speed to go from 13% to 50% mud evacuation. This indicates that it is not a good scenario for mud evacuation at intermediate speeds.

Group 2

Mud Busting Structures

Figure 5A:
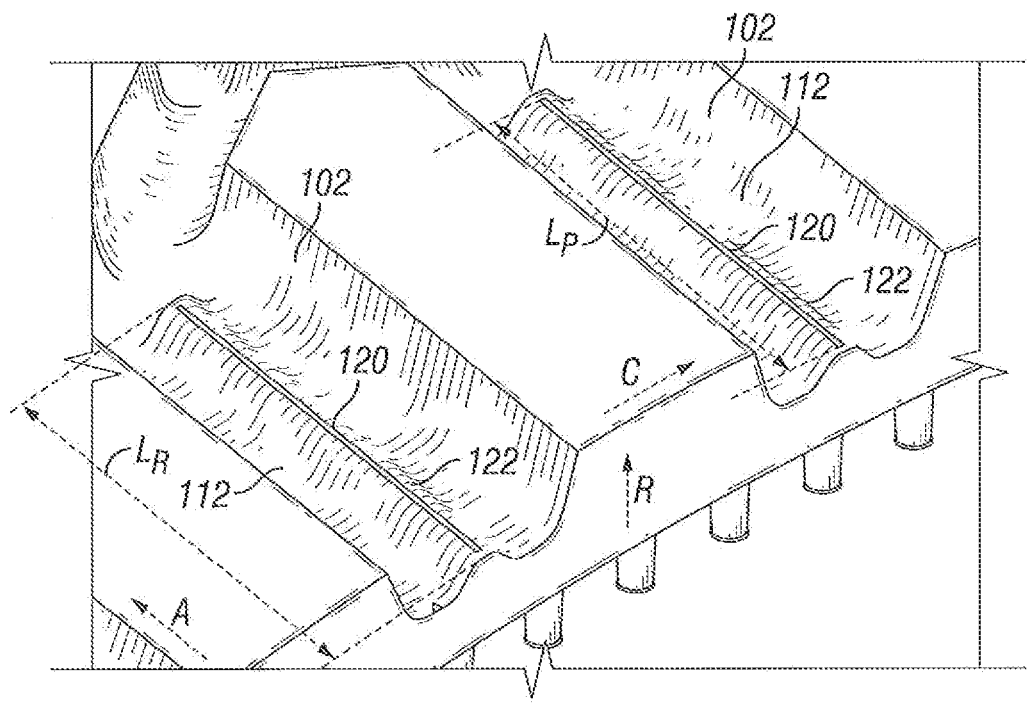
FIG. 5A is an enlarged perspective view of a scenario where there is a ridge on the bottom surface of a shoulder groove with a pocket being found therein.
Figure 5B:
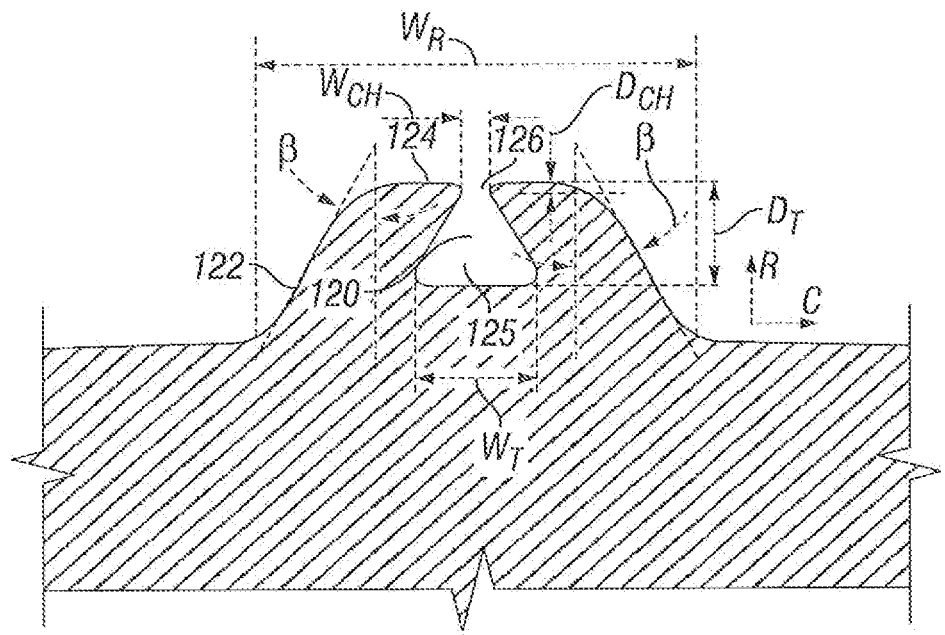
FIG. 5B is a partial cross-sectional view of the ridge and pocket found on the bottom surface of the shoulder groove of the tread of FIG. 5A.
Figure 5C:
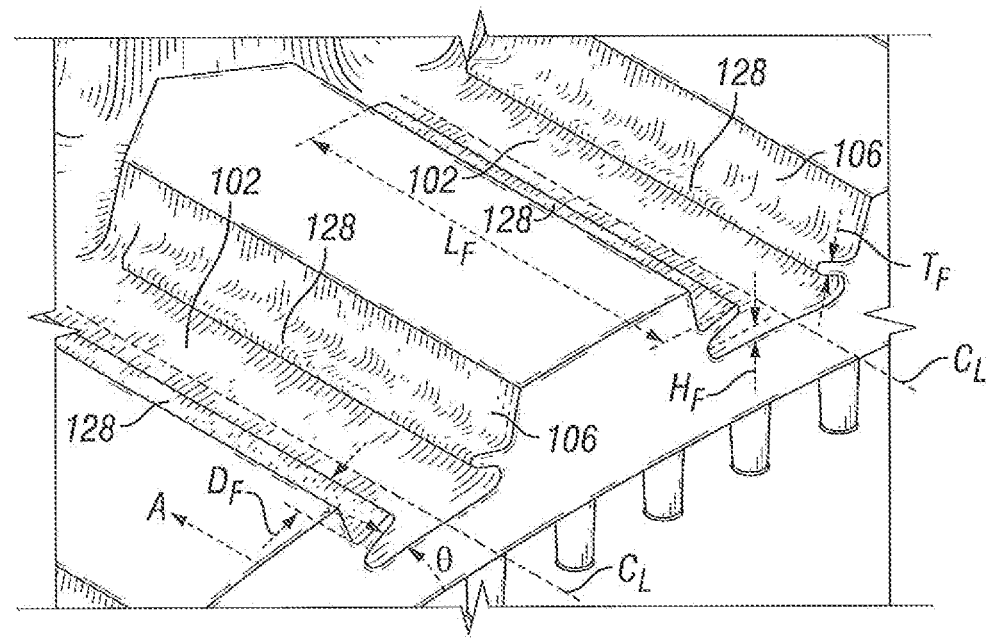
FIG. 5C is an enlarged perspective view of a scenario where fins are found on the sidewalls of the shoulder groove of a tread sample.

Looking at FIGS. 5A-5C, different tread groove features that help to break the adhesion of mud, sand, etc. to the walls and/or bottom surface of the grooves of tires are shown. These features are typically sized on a macro scale.

As shown by FIGS. 5A and 5B, one example of a mud busting feature is the presence of a pocket 120 located on a ridge 122 on the bottom surface 112 of the shoulder groove 102. The ridge 122 has a length, $L_R$, in the axial direction A and a width, $W_R$, measured at its base in the circumferential direction C and may flare out from its top surface 124 at an angle, β, on both sides of the ridge 122. The cross sectional shape of the pocket 120 is a triangle 125 that is connected to the top surface 124 by a small channel 126. The channel 126 has a depth, $D_{CH}$, in the radial direction R and a width, $W_{CH}$, in the axial direction A. Similarly, the triangular portion 125 of the pocket 120 has a depth, $D_T$, from the top 124 of the ridge 122, in the radial direction, R, and a width, $W_T$, in the circumferential direction C. The triangular shape 125 points in the radial direction R of the tread. For these embodiments, the length and width of the pocket 120, $L_P$ and $W_T$, is centered with respect to the length and width of the ridge 122, $L_R$ and $W_R$, so that the ends of the pocket 120 are separated from the atmosphere by a thin portion of the ridge 122.

For scenarios 2A and 2B, $L_R$ is 57.5 mm, $L_P$ is 55.5 mm, $W_{CH}$ is 0.6 mm, and $D_{CH}$ is 0.2 mm. In other situations, the pocket 120 may extend laterally to an opening to atmosphere found on the side of the tread which remains open even when the groove is filled with matter. This may help alleviate any suction that is keeping mud in the groove. For scenario 2A, $W_T$ is 3.5 mm, $D_T$ is 4 mm, and $W_R$ is 11 mm. For scenario 2B, $W_T$ is 2.5 mm, $D_T$ is 2.25 mm, and $W_R$ is 10 mm. Angle β is approximately 40° for both these scenarios. Of course, all of these values may be adjusted as desired.

As shown by FIG. 5C, another example of a mud busting feature is the use of fin 128 or fins on the sidewall 106 of a groove. The fins 128 have a length in the axial direction A, $L_F$, thickness, $T_F$, and extend a predetermined distance, $D_F$, from the sidewall 106 at an angle, θ. They are also located a predetermined distance, $H_F$, from the bottom surface 112 of the groove in the radial direction R. The fins are symmetrical about the centerline $C_L$ of the shoulder groove.

It should be noted that all of these scenarios were added to scenario 1A in the shoulder grooves 102 of that embodiment and are alike in all other respects. For convenience, the relevant data that differentiate these scenarios including scenario 1A, which is provided as a reference, is listed in Table 3 below.

TABLE 3

| Scenario | $W_T$ | $D_T$ | $W_R$ | Fins on sidewalls |
|---|---|---|---|---|
| 1A | N/A | N/A | N/A | No |
| 2A | 3.5 mm | 4 mm | 11 mm | No |
| 2B | 2.5 mm | 2.25 mm | 10 mm | No |
| 2C | N/A | N/A | N/A | Yes |

Scenarios 2A thru 2C were tested in a similar fashion as previously described for Scenarios 1A thru 1D. Calculations for the average rotational speeds necessary to achieve 13%, 50%, and 87% mud evacuation for multiple test runs, the average change in speeds necessary to go from one mud evacuation percentage to another for these test runs, as well the averages and standard deviations for these parameters were also calculated and are shown in Table 4 below.

TABLE 4

| SCENARIO | Avg. 13% Evac. RPM | Std. Dev. 13% Evac. RPM | Avg. 50% Evac. RPM | Std. Dev. 50% Evac. RPM | Avg. 87% Evac. RPM | Std. Dev. 87% Evac. RPM | Avg. Diff. 13% to 50% | Std. Dev. 13% to 50% | Avg. Diff. 50% to 87% | Std. Dev. 50% to 87% | Avg. Diff. 13% to 87% | Std. Dev. 13% to 87% |
|---|---|---|---|---|---|---|---|---|---|---|---|---|
| 1A | 201.1 | 9.4 | 217.9 | 16.0 | 226.1 | 15.6 | 16.9 | 9.1 | 8.2 | 0.6 | 25.0 | 8.5 |
| 2A | 189.1 | 7.5 | 194.5 | 6.7 | 211.1 | 8.1 | 5.4 | 4.7 | 16.7 | 9.1 | 22.0 | 10.3 |

TABLE 4-continued

| SCENARIO | Avg. 13% Evac. RPM | Std. Dev. 13% Evac. RPM | Avg. 50% Evac. RPM | Std. Dev. 50% Evac. RPM | Avg. 87% Evac. RPM | Std. Dev. 87% Evac. RPM | Avg. Diff. 13% to 50% | Std. Dev. 13% to 50% | Avg. Diff. 50% to 87% | Std. Dev. 50% to 87% | Avg. Diff. 13% to 87% | Std. Dev. 13% to 87% |
|---|---|---|---|---|---|---|---|---|---|---|---|---|
| 2B | 177.6 | 9.8 | 203.1 | 7.8 | 206.0 | 10.2 | 25.5 | 8.9 | 2.9 | 5.4 | 28.4 | 10.9 |
| 2C | 211.1 | 8.7 | 216.4 | 6.4 | 277.9 | 4.4 | 5.3 | 10.0 | 61.5 | 8.1 | 66.8 | 6.2 |

Scenarios 2A and 2B showed improvements over the reference scenario of 1A. Scenario 2B started to evacuate mud earlier than the other scenarios, but Scenario 2A reached 50% mud evacuation the soonest of these scenarios indicating that it has good mud evacuation properties at intermediate rotational speeds. Scenario 2C did not work as intended as once mud was compacted underneath the fins the fins were not able to break the suction of the mud to the groove wall surfaces.

Group 3

Groove Wall Textures

Turning to FIGS. 6A-6H different scenarios of groove wall textures on a micro scale that were tested using the above mentioned testing apparatus and techniques to see if they helped break the suction between the mud and groove walls are shown.

Figure 6A:
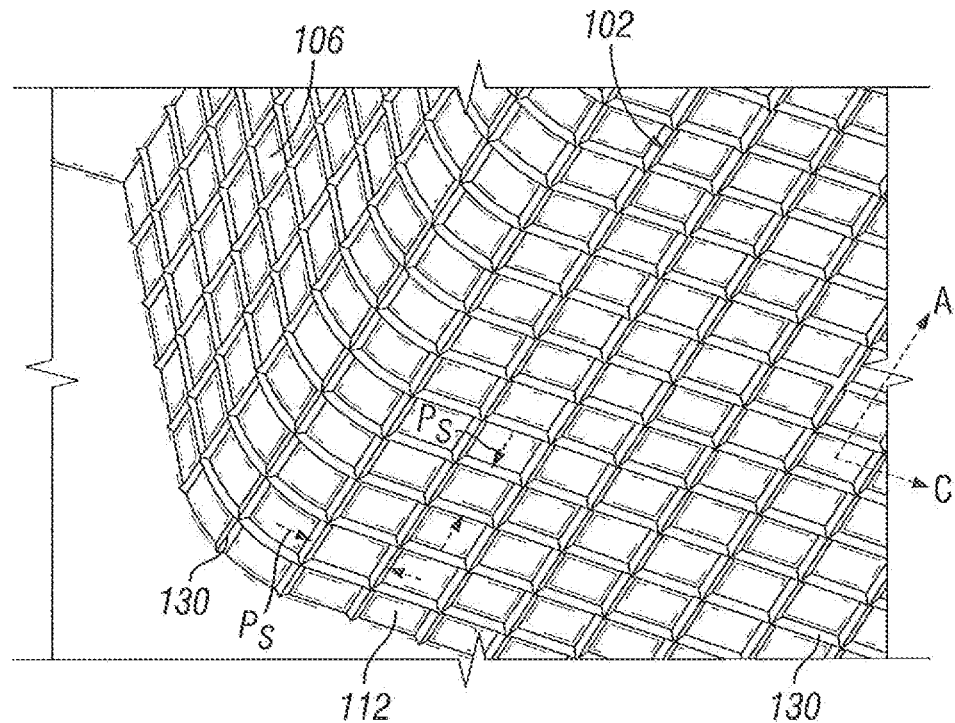
FIG. 6A is an enlarged perspective view of stries arranged in a rectangular pattern as is employed by scenarios 3A and 3B.
Figure 6B:
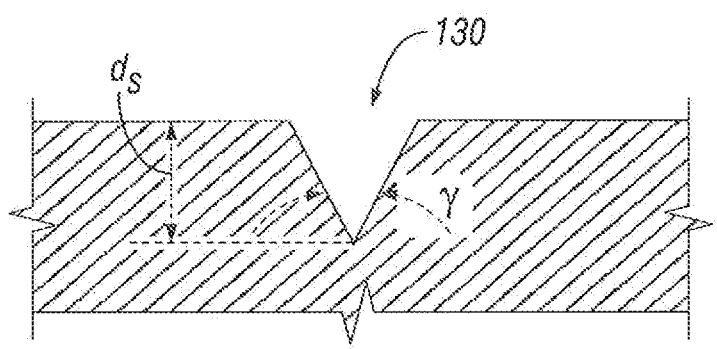
FIG. 6B is partial cross-sectional view showing the profile of the stries used in scenarios 3A thru 3D.

FIGS. 6A and 6B show that one such embodiment comprises a series of small grooves or stries 130 found on the groove walls 106 and/or bottom groove surface 112. In this case, the stries 130 cross each other perpendicularly in the axial and circumferential directions A, C of the tread, forming a rectangular pattern, and are found only in the shoulder grooves 102. The profile of these stries 130, as best shown by FIG. 6B, is triangular with an included angle, $\gamma$, at their bottom portion and a depth, $d_s$, in the normal direction of the surface from which they extend. Thus, the triangular profile points along the normal direction of the surface of the groove where the stries 130 are found. For scenario 3A, the depth, $d_s$, of such stries is 0.75 mm and they have a pitch, $p_s$, of 2.25 mm in both orthogonal directions. In a similar case (scenario 3B), the stries cross each with a depth, $d_s$, of 0.2 mm with a pitch, $p_s$, of 2.0 mm in both orthogonal directions. Both sets of stries have a bottom included angle, $\gamma$, of ninety degrees.

Figure 6C:
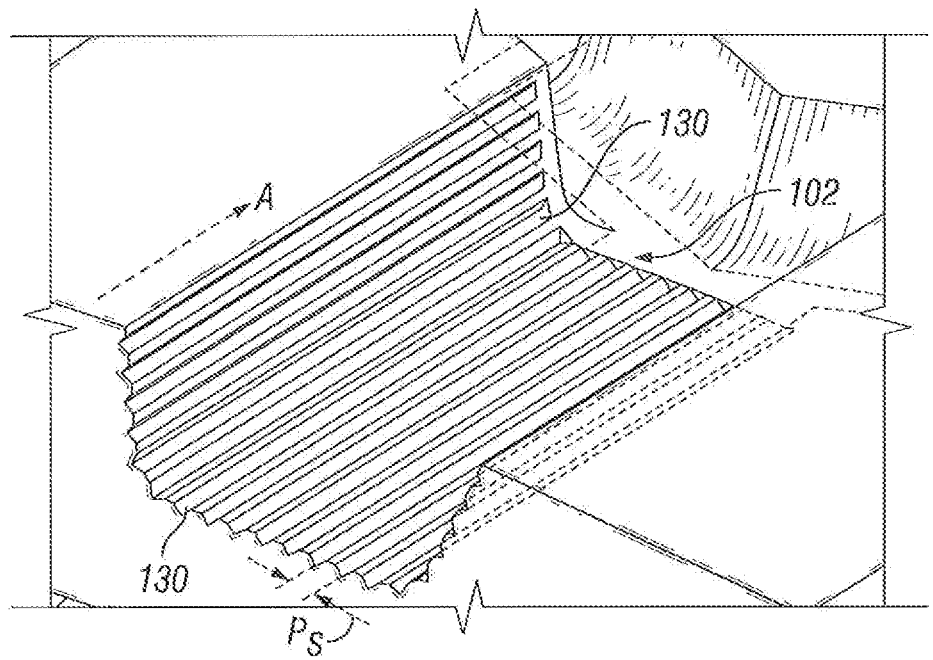
FIG. 6C is an enlarged perspective view of scenario 3C where the stries are arranged in the axial direction of the tread alone.
Figure 6D:
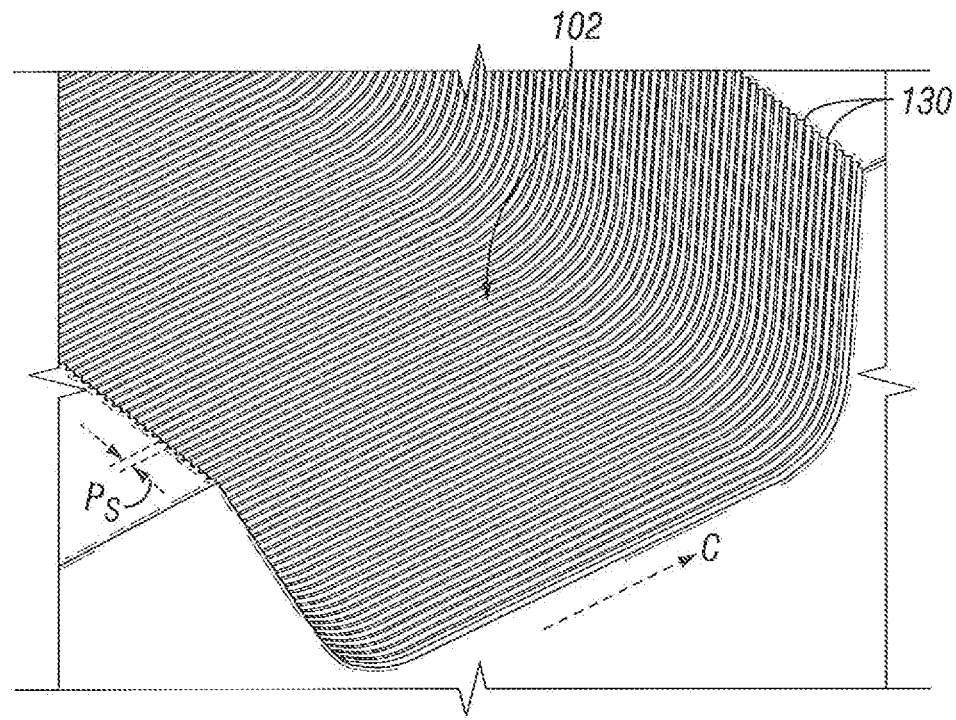
FIG. 6D is an enlarged perspective view of scenario 3D where the stries are arranged in the circumferential direction of the tread alone.

FIG. 6C shows that in some scenarios the stries 130 are aligned in only one direction and have a similar triangular profile as shown in FIG. 6B with an included angle at its bottom portion, $\gamma$, and a depth, $d_s$. The triangular profile points in the normal direction of the surface where the stries are found. For scenario 3C, the depth, $d_s$, of the stries is 0.75 mm, the pitch, $p_s$, is 7.5 mm, and the stries are oriented in the axial direction A of the tread alone. In another similar case shown in FIG. 6D, which corresponds to scenario 3D, $d_s$ is 0.2 mm and $p_s$ is 0.6 mm and the stries 130 are oriented in circumferential direction C of the tread alone. Both sets of stries 130 have a bottom included angle, $\gamma$, of ninety degrees.

Figure 6E:
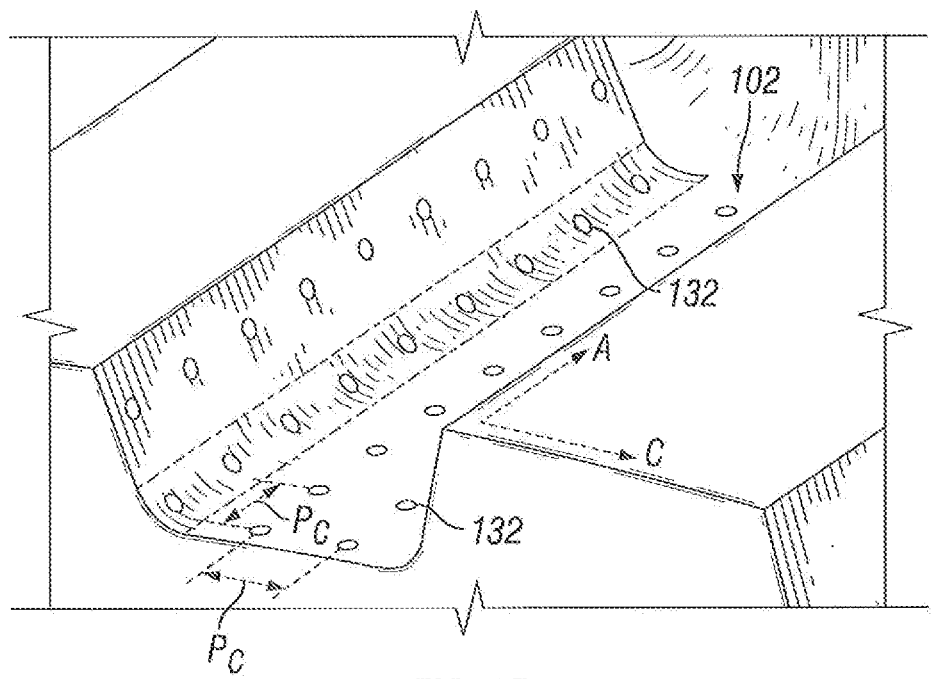
FIG. 6E is an enlarged perspective view of hole or dimples arranged in a rectangular array as is employed by scenarios 3E and 3F.
Figure 6F:
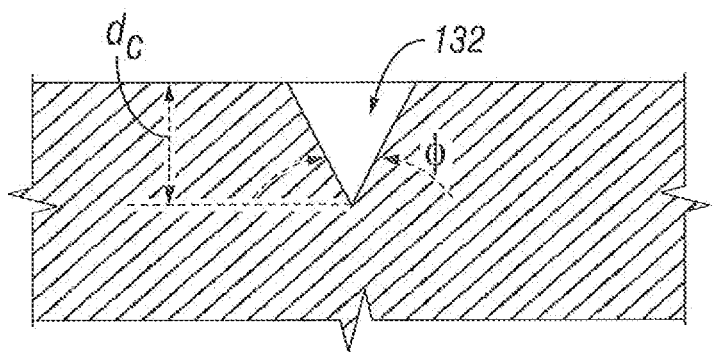
FIG. 6F is a partial cross-sectional view showing the profile of the holes used in scenarios 3E and 3F.

FIGS. 6E and 6F shows a scenario where small holes or dimples 132 are found along the surfaces of the shoulder grooves 102. The dimples or holes 132 are shaped like inverted cones with an included angle, $\phi$, at their bottom portion and a depth, $d_c$, in the normal direction of the surface where the holes 132 are found. The cones point in this normal direction and the included angle, $\phi$, was ninety degrees for all the scenarios discussed here. For scenario 3E, $d_c$ is 0.75 mm and the dimples or holes 132 are arranged in a rectangular array wherein the pitch, $p_c$, of the dimples or holes is 7.5 mm in both the axial and circumferential directions A, C of the tread. For scenario 3F, $d_c$ is 0.2 mm and they are arranged in a rectangular array with their pitch, $p_c$, being 0.6 mm.

Figure 6G:
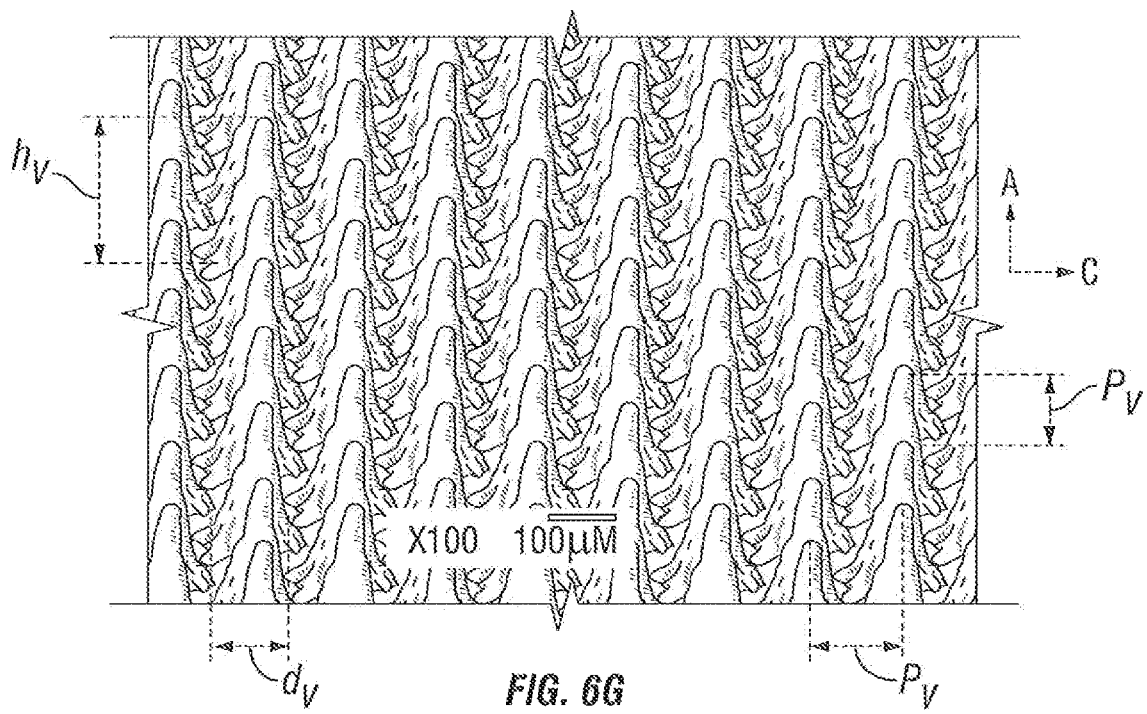
FIG. 6G shows the conically shaped pillars found on the groove surface of scenario 3G.
Figure 6H:
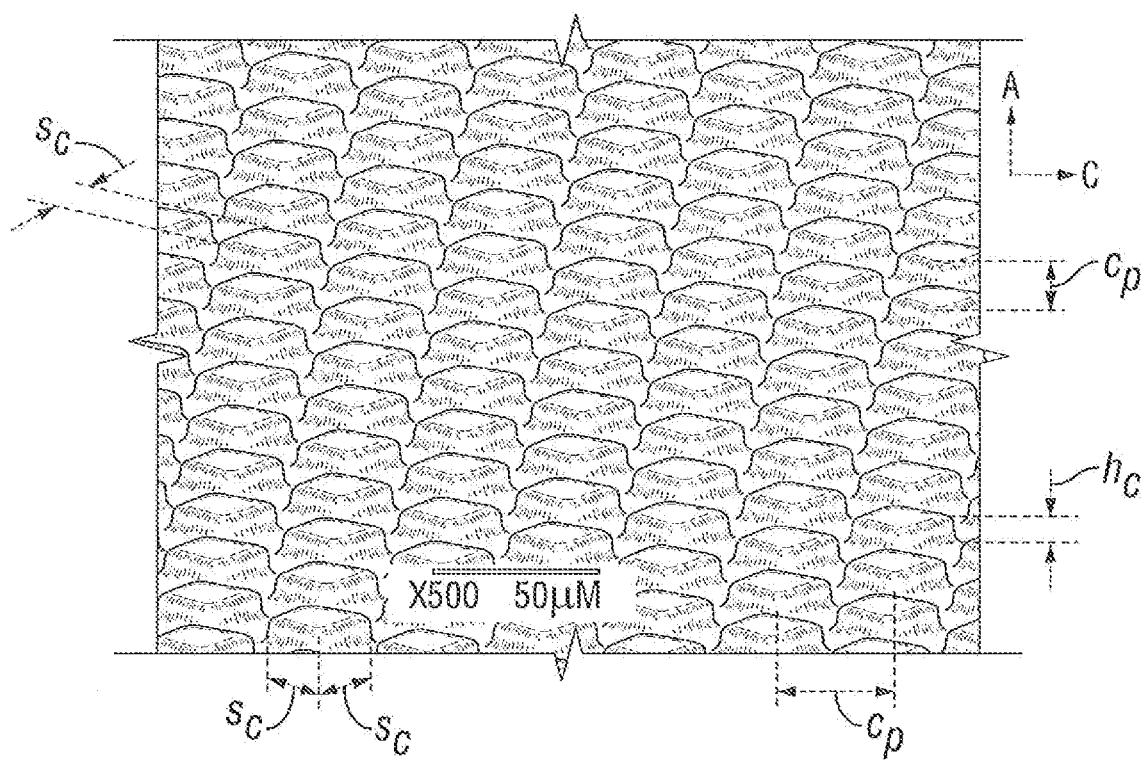
FIG. 6H illustrates square shaped columns found on the groove surface of scenario 3H.

FIG. 6G shows yet another example of groove wall textures in the form of velours. Velours may include small conically shaped pillars 134 on groove surfaces on a micro scale. The pillars 134 may be 0.15 mm in diameter, $d_v$, and 0.3-0.4 mm in height, $h_v$, and be arranged in a rectangular pattern with a pitch, $p_v$, of 0.2 mm in both the axial and circumferential A, C directions of the tread. In this case, the pillars are found only on the surfaces that form the shoulder groove of the tires. Similarly, FIG. 6H shows a similar scenario where square shaped columns 136 that are 0.01 mm long on each side, $s_c$, and 0.005 mm in height, $h_c$, with a pitch, $c_p$, of 0.02 mm in both the axial and circumferential directions A, C of the tread are found on the groove surface. The pillars 134 may be formed in some cases by burning holes into the surfaces of a mold that form the grooves of the tread using a laser. The columns 136 may be formed by placing a film having holes that are complimentary shaped to the columns onto the surfaces of the mold that form the grooves of the tread. Of course, the dimensions, shapes, and relative spacing of these pillars and columns may be altered as desired.

For convenience, the relevant data that differentiate these different scenarios including scenario 3I, is provided in Table 5 below. Scenario 3I is identical to sample 1A except that a slight texture was created by using laser sintered mold components to form the tread and is provided as a reference since all the scenarios of Group 3 were created using this technology. The geometry for the center grooves was the same for all of these scenarios and all of these scenarios were created by adding the described features to the geometry of scenario 1A. Of course, the variables for all the embodiments in group 3 may be varied as desired.

TABLE 5

| SCENARIO | Stries in Axial Direction | Stries in Circ. Direction | Pitch $p_s$, $p_v$, $c_p$ or $p_c$ | Depth $d_s$, $d_c$ or Height $h_c$, $h_v$ | Holes in Rect. Pattern or Array | Pillars | Columns | Laser Sintering Texture On Groove Walls |
|---|---|---|---|---|---|---|---|---|
| 3A | Yes | Yes | 2.25 mm | .75 mm | No | No | No | Yes |
| 3B | Yes | Yes | 2 mm | .2 mm | No | No | No | Yes |
| 3C | Yes | No | 7.5 mm | .75 mm | No | No | No | Yes |
| 3D | No | Yes | .6 mm | .2 mm | No | No | No | Yes |
| 3E | No | No | 7.5 mm | .75 mm | Yes | No | No | Yes |
| 3F | No | No | .6 mm | .2 mm | Yes | No | No | Yes |
| 3G | No | No | .2 mm | .3-.4 mm | No | Yes | No | Yes |
| 3H | No | No | .02 mm | .005 mm | No | No | Yes | Yes |
| 3I | No | No | No | No | No | No | No | Yes |

Figure 7:
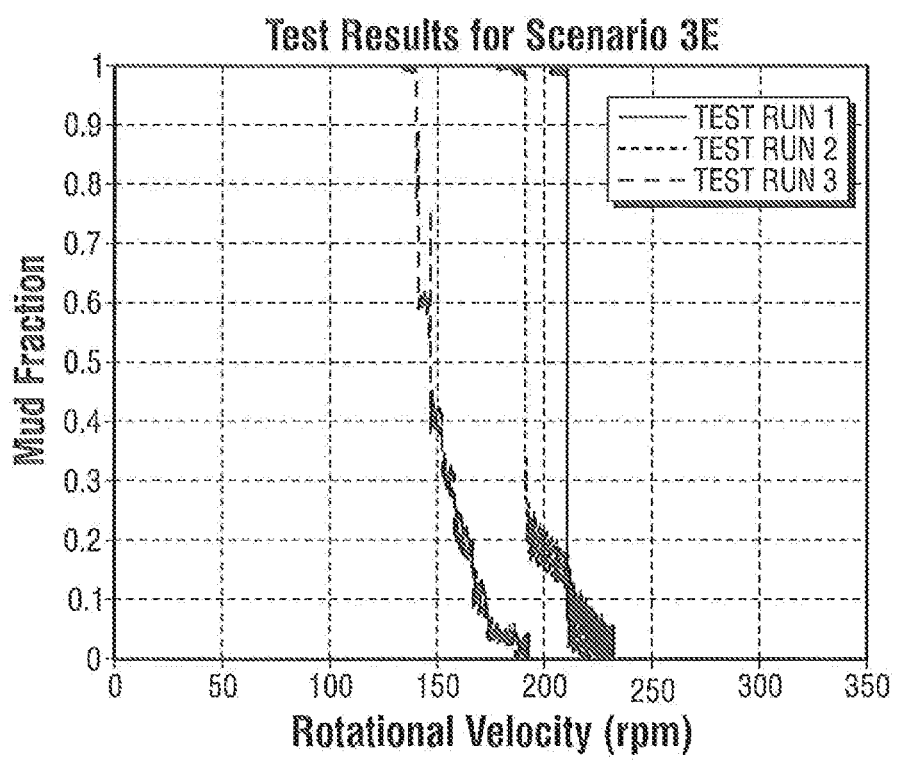
FIG. 7 is a graph showing the mud fraction left in the grooves of the tread sample for scenario 3E versus rotational speed of the test apparatus for multiple runs.

Scenarios 3A thru 3I were tested in a similar fashion as previously described for Scenarios 1A thru 1D. Likewise, data concerning the fraction of mud remaining in the grooves of numerous test runs for scenario 3E was graphed and is shown in FIG. 7. Calculations for the average rotational speeds necessary to achieve 13%, 50%, and 87% mud evacuation for multiple test runs, the average change in speeds necessary to go from one mud evacuation percentage to another for these test runs, as well the standard deviations for these parameters were also calculated and are shown in Table 6 below.

TABLE 6

| SCENARIO | Avg. 13% Evac. RPM | Std. Dev. 13% Evac. RPM | Avg. 50% Evac. RPM | Std. Dev. 50% Evac. RPM | Avg. 87% Evac. RPM | Std. Dev. 87% Evac. RPM | Avg. Diff. 13% to 50% | Std. Dev. 13% to 50% | Avg. Diff. 50% to 87% | Std. Dev. 50% to 87% | Avg. Diff. 13% to 87% | Std. Dev. 13% to 87% |
|---|---|---|---|---|---|---|---|---|---|---|---|---|
| 3A | 193.6 | 20.9 | 196.5 | 21.7 | 215.6 | 19.8 | 2.9 | 3.0 | 19.1 | 7.3 | 22.0 | 5.3 |
| 3B | 186.6 | 19.0 | 195.3 | 11.4 | 216.1 | 15.8 | 8.7 | 8.7 | 20.7 | 13.9 | 29.4 | 17.2 |
| 3C | 198.8 | 7.6 | 204.2 | 6.5 | 217.6 | 7.9 | 5.4 | 4.8 | 13.4 | 8.6 | 18.8 | 10.1 |
| 3D | 200.6 | 8.9 | 207.6 | 4.0 | 214.2 | 5.4 | 7.1 | 6.0 | 6.5 | 5.2 | 13.6 | 10.5 |
| 3E | 181.0 | 36.3 | 183.5 | 32.6 | 194.5 | 23.8 | 2.4 | 3.9 | 11.0 | 10.0 | 13.4 | 13.1 |
| 3F | 186.6 | 20.4 | 195.3 | 16.9 | 210.4 | 8.1 | 6.9 | 12.0 | 16.8 | 19.6 | 23.7 | 26.5 |
| 3G | 154.2 | 15.1 | 195.6 | 9.6 | 241.0 | 12.3 | 39.1 | 12.4 | 45.4 | 5.1 | 84.0 | 7.3 |
| 3H | 192.1 | 12.6 | 219.5 | 8.2 | 236.9 | 3.5 | 27.5 | 15.1 | 17.4 | 6.6 | 44.8 | 10.7 |
| 3I | 193.2 | 2.1 | 203.3 | 8.8 | 218.3 | 4.4 | 10.1 | 7.7 | 15.0 | 11.9 | 25.1 | 4.7 |

Scenarios 3E, 3F and 3G all showed significant improvements versus the reference scenario 3I for 13% and 50% mud evacuation. All these scenarios, performed relatively well once mud evacuation commenced, indicating that these features are effective at relieving the suction forces that keep the mud in the grooves once these features are exposed to the atmosphere. This prompts a tire designer to find a way to initiate mud evacuation some other way so that the full benefit of these features can be utilized to their full potential.

Design Method

Consequently, the Applicant has developed a method to combine features that exhibit good initial mud evacuation at lower rotational speeds, even though they do not help to significantly evacuate mud at intermediate speeds, with features that exhibit good intermediate mud evacuation, even though they do not significantly help evacuation mud at low speeds. For example, scenario 2A, which exhibits good mud evacuation at intermediate speeds, may be combined with scenario 1C, which exhibits good mud evacuation at low speeds, to see if their combined use provides for a solution that has the lowest change of speed necessary to evacuate 50-87% of the mud found in the grooves. Furthermore, a texture selected from Group 3, such as scenario 3E, may be added to improve performance even further. If a selected number of solutions provide good results when combined, a full tire with these features may be produced to see if it works well. If so, the tire may be commercialized. If the tire does not work, more iteration is necessary.

It should be understood that the present invention includes various other modifications that can be made to the exemplary embodiments described herein. These and other embodiments of the present invention are with the spirit and scope of the claims that follow.

What is claimed is:

1. A tire with a tread having circumferential and axial directions, said tread comprising staggered outside tread blocks located in a shoulder region of the tread and ridges with pockets formed therein found on bottom surfaces of a plurality of shoulder grooves found on the tread, wherein the staggered outside tread block outside wall is offset by an axial distance from an adjacent outside tread block outside wall.

2. The tire of claim 1, wherein the offset distance of the staggered tread blocks from the side of the tread to the nearest portion of the staggered tread block is approximately 15 mm.

3. The tire of claim 1, wherein the pocket has substantially triangular cross-section with a width of approximately 3.5 mm and a depth of approximately 4 mm.

4. The tire of claim 1, wherein the tread further comprises a texture found on a plurality of shoulder grooves wherein the texture has a plurality of small conically shaped pillars that are 0.15 mm in diameter, 0.3-0.4 mm in height, and are arranged in a rectangular array that has a pitch of 0.2 mm in both the circumferential and axial directions of the tire.

5. The tire of claim 1, wherein the outside wall of the outside tread block and the outside wall of the adjacent outside tread block do not extend beyond an outside edge of the tread.

6. The tire of claim 1, wherein the triangular cross-section has a width of between approximately 2.5 mm and approximately 3.5 mm and a depth of between approximately 2.25 mm and approximately 4 mm.

* * * * *